(12) United States Patent
Sakuma et al.

(10) Patent No.: US 7,938,212 B2
(45) Date of Patent: May 10, 2011

(54) IN-WHEEL MOTOR SYSTEM

(75) Inventors: Masafumi Sakuma, Chiryu (JP);
Shigetaka Isogai, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 78 days.

(21) Appl. No.: 12/397,077

(22) Filed: Mar. 3, 2009

(65) Prior Publication Data

US 2009/0236158 A1 Sep. 24, 2009

(30) Foreign Application Priority Data

Mar. 19, 2008 (JP) .................................. 2008-071615

(51) Int. Cl.
*B60K 1/02* (2006.01)
(52) U.S. Cl. .................................................. 180/65.51
(58) Field of Classification Search ................ 180/65.51
See application file for complete search history.

(56) References Cited

U.S. PATENT DOCUMENTS

| 5,163,528 A * | 11/1992 | Kawamoto et al. ........ 180/65.51 |
| 7,703,780 B2 * | 4/2010 | Mizutani et al. ........... 280/124.1 |
| 2007/0199339 A1 | 8/2007 | Ishihara et al. |
| 2008/0035399 A1 * | 2/2008 | Murata et al. ............... 180/65.5 |

FOREIGN PATENT DOCUMENTS

| JP | 2007-191027 A | 8/2007 |
| JP | 2007-191035 A | 8/2007 |
| JP | 2007-215311 A | 8/2007 |

* cited by examiner

*Primary Examiner* — Jeffrey J Restifo
*Assistant Examiner* — Erez Gurari
(74) *Attorney, Agent, or Firm* — Buchanan Ingersoll & Rooney PC

(57) ABSTRACT

An in-wheel motor system includes a knuckle supporting a hub to be rotatable and including a tank portion in which a refrigerant is accumulated, a housing fixedly attached to the knuckle, a motor incorporated within the housing and driving the hub to rotate, and a pump incorporated within the housing and pumping the refrigerant accumulated within the tank portion to the motor by means of a rotational power of the motor to refrigerate the motor.

16 Claims, 6 Drawing Sheets

IN-WHEEL MOTOR SYSTEM

CROSS REFERENCE TO RELATED APPLICATIONS

This application is based on and claims priority under 35 U.S.C. §119 to Japanese Patent Application No. 2008-071615, filed on Mar. 19, 2009, the entire content of which is incorporated herein by reference.

FIELD OF THE INVENTION

This invention generally relates to an in-wheel motor system. More particularly, this invention pertains to an in-wheel motor system including a cooling apparatus.

BACKGROUND

A vehicle driven by a motor such as an electrical vehicle may be equipped with an in-wheel motor system in which a motor is incorporated within a wheel. In such vehicle, since an output of the motor decreases along with the increase of the temperature of the motor while the vehicle is being driven, a cooling apparatus for cooling the motor may be provided.

For example, JP2007-191027A (Reference 1) and JP2007-191035A (Reference 2) each disclose an in-wheel motor system including a geared motor in which an electrical motor is arranged in the rear of a reduction gear mechanism. According to the in-wheel motor system disclosed, the geared motor is supported at a knuckle in an elastic manner by means of a dynamic vibration absorber. An output shaft of the electrical motor includes a hollow portion where an oil introduction passage is formed. A motor case is accommodated within a cylindrical-shaped housing to thereby form a stator cooling passage. The stator cooling passage and an inside of the reduction gear mechanism are connected to each other via an oil passage. A gear oil sent through a pipe and the oil introduction passage from an oil supply apparatus provided at a vehicle body is circulated inside the reduction gear mechanism and the stator cooling passage. As a result, a mass of the gear oil is added to a mass of a dynamic damper. The motor is effectively cooled without increasing a size of the motor accordingly.

In addition, JP2007-215311A (Reference 3) discloses a cooling apparatus of an in-wheel motor. According to the cooling apparatus disclosed, a stator and a cooling passage through which a refrigerant flows are thermally connected to each other. A capacitor for changing the phase of the refrigerant that is in the gas phase at the cooling passage to the liquid phase is connected to a downstream side of the cooling passage and is also arranged at a vertically downward side of the cooling passage upon assembly onto a vehicle. Then, a check valve is disposed between the cooling passage and a refrigerant return passage for returning the refrigerant that is in the liquid phase at the capacitor to an upstream side of the cooling passage. Another check valve is disposed between the capacitor and the refrigerant return passage. As a result, the refrigerant is self-circulated to thereby achieve a downsizing of the cooling apparatus and enhance the cooling performance of the refrigerant.

According to the in-wheel motor system disclosed in each of References 1 and 2, the oil supply apparatus serving as a cooling apparatus is not configured to follow a positional variation of the motor upon operation of a tire, shock absorption, or the like. The pipe connecting the oil supply apparatus and the motor is required to absorb the positional variation of the motor. As a result, an area for allowing or permitting the positional variation of the motor is limited. In addition, the in-wheel motor system disclosed in each of References 1 and 2 does not include means for cooling the oil of which temperature has increased, which may prevent effective cooling of the motor.

According to the cooling apparatus of the in-wheel motor disclosed in Reference 3, the capacitor for air-cooling the refrigerant is arranged at an inner peripheral side of the tire, which may prevent sufficient air supply and air-cooling of the refrigerant. In addition, since the capacitor is arranged at an outer peripheral side (i.e., vertically downward side) of a housing of the motor, the size of the motor should be reduced, which may prevent a use of the motor having a high output level. Further, a sufficient refrigerant volume may not be obtained because of the size of the motor. In such case, heat transfer efficiency from a motor coil to the housing deteriorates, thereby increasing the temperature of the motor. Furthermore, since the capacitor is exposed to the outside of the tire, the capacitor may be damaged by flying gravel while the vehicle is being driven.

A need thus exists for an in-wheel motor system which is not susceptible to the drawback mentioned above.

SUMMARY OF THE INVENTION

According to an aspect of the present invention, an in-wheel motor system includes a knuckle supporting a hub to be rotatable and including a tank portion in which a refrigerant is accumulated, a housing fixedly attached to the knuckle, a motor incorporated within the housing and driving the hub to rotate, and a pump incorporated within the housing and pumping the refrigerant accumulated within the tank portion to the motor by means of a rotational power of the motor to refrigerate the motor.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
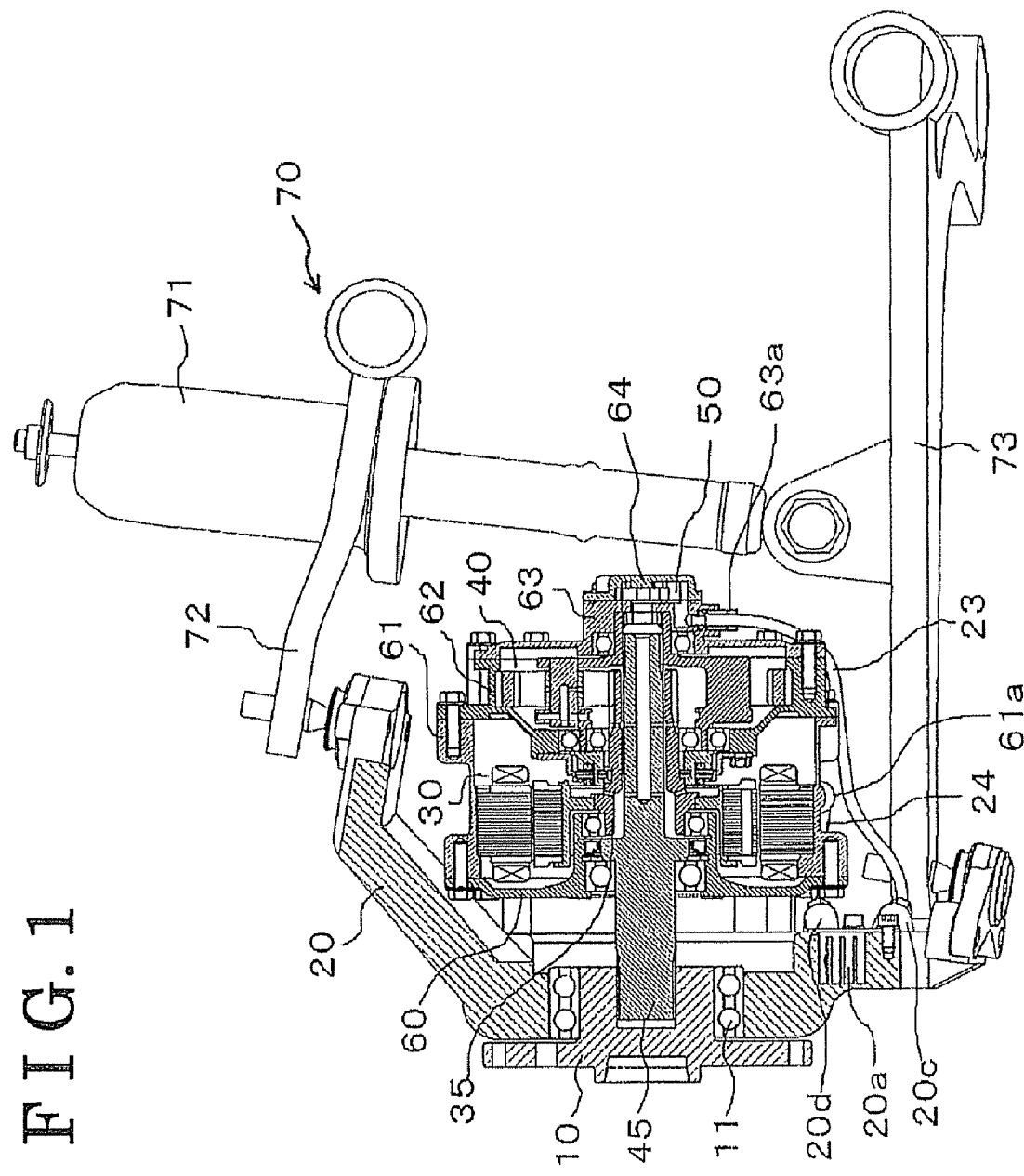
FIG. 1 is a perspective view illustrating a structure in which an in-wheel motor system is mounted onto a suspension apparatus (in-wheel motor system only is shown in cross-section) according to an embodiment of the present invention.
Figure 2:
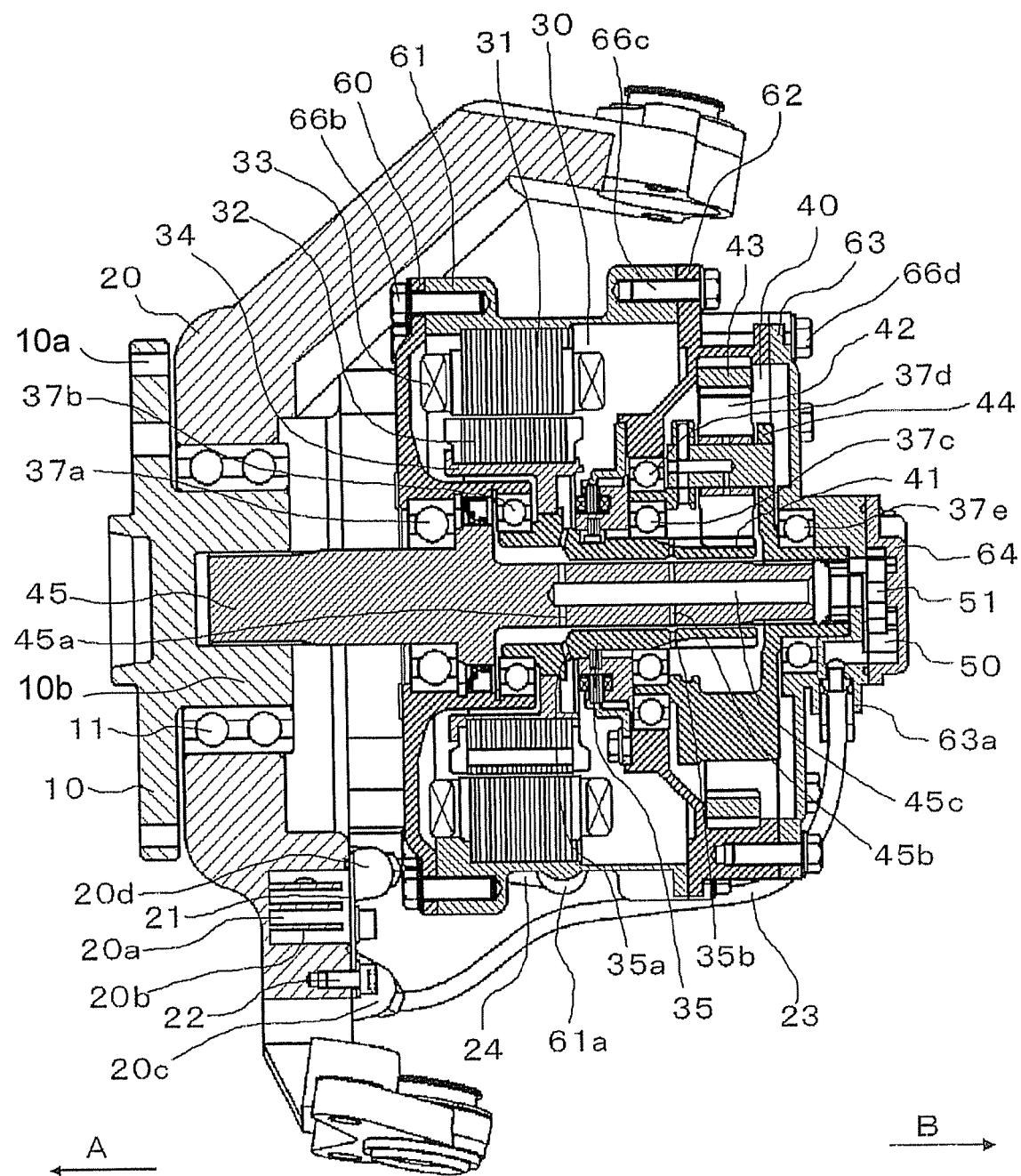
FIG. 2 is a cross-sectional view illustrating a structure of the in-wheel motor system according to the embodiment of the present invention.

An embodiment of an in-wheel motor system will be explained with reference to the attached drawings. As illustrated in FIGS. 1 and 2, the in-wheel motor system according to the present embodiment includes a knuckle 20, a hub 10, housings 60, 61, 62, 63, and 64, a motor 30, a pump 50, a first pipe 23, passages 45c, 45a, and 35a, (a first flow passage), and a second pipe 24. The knuckle 20 includes an oil tank portion 20a (a tank portion) for accumulating a refrigerant. The hub 10, to which a wheel is fixedly attached, is rotatably supported at the knuckle 20. The housings 60 to 64 are fixedly attached to the knuckle 20. The motor 30 is incorporated within the housings 60 to 64 for rotating the hub 10. The pump 50 is incorporated within the housings 60 to 64 for pumping the refrigerant to the motor 30 by means of a rotational power of the motor 30. The first pipe 23 sends the refrigerant within the oil tank portion 20a to the pump 50. The passages 45c, 45a and 35a send the refrigerant pumped from the pump 50 to each component member of the motor 30. The second pipe 24 sends the refrigerant within the housings 60 to 64 to the oil tank portion 20a.

As illustrated in FIGS. 1 and 2, the in-wheel motor system is obtained by the motor 30 incorporated within the wheel. According to the in-wheel motor system, the hub 10 to which the wheel, a brake apparatus, and the like is fixed is rotatably supported at the knuckle 20 by means of a bearing 11. An assembly constituted by the housings 60 to 64 that incorporate therein the motor 30, a reduction gear 40, and the pump 50 is fixed to the knuckle 20. The hub 10 and an output shaft 45 to which a rotational power of the motor 30 is outputted via the reduction gear 40 are connected to each other. The in-wheel motor system is connected in a vertically movable manner to a suspension apparatus 70 that absorbs shock. Specifically, an upper portion of the knuckle 20 is connected in a vertically movable manner to an upper arm 72 of the suspension apparatus 70 while a lower portion of the knuckle 20 is connected in a vertically movable manner to a lower arm 73 of the suspension apparatus 70. The knuckle 20 is biased to a lower side in FIG. 2 (i.e., a road surface side) by a shock absorber 71 via the lower arm 73.

The hub 10 serves as a rotation member for stabilizing the wheel and/or the brake apparatus. The hub 10 includes a flange portion 10a at a side close to a tire (wheel), i.e., at a tire side (wheel side), shown by an arrow A in FIG. 2 and a cylindrical portion 10b extending from a center of the flange portion 10a towards a vehicle body, i.e., at a vehicle body side shown by an arrow B in FIG. 2. The hub 10 is rotatably supported at the knuckle 20 at an outer periphery of the cylindrical portion 10b by means of the bearing 11. In addition, the hub 10 is spline-connected to the output shaft 45 at an inner periphery of the cylindrical portion 10b.

The bearing 11 is disposed between the hub 10 and the knuckle 20 so as to support the hub 10 to be rotatable to the knuckle 20.

The knuckle 20 serves as a structural member for holding the wheel. The knuckle 20 is movably attached to the vehicle body by means of the upper arm 72 connected to the upper portion of the knuckle 20. In addition, the knuckle 20 is movably attached to the vehicle body by means of the lower arm 73 connected to the lower portion of the knuckle 20. The knuckle 20 is biased to the downward side in FIG. 2 (i.e., a road surface side) by the shock absorber 71 via the lower arm 73. The knuckle 20 includes a through-hole at a center so as to support the cylindrical portion 10b of the hub 10 by means of the bearing 11. The assembly of the housings 60 to 64 is fixedly attached via a bolt 66a (see FIG. 3) to a surface of the knuckle 20 at the vehicle body side shown by the arrow B.

The knuckle 20 includes the oil tank portion 20a that is positioned lower than a position of the assembly of the housings 60 to 64 in FIG. 2. Specifically, the oil tank portion 20a is provided at a dead space of the knuckle 20 which affects a strength of the knuckle 20 to a lesser degree. The oil tank portion 20a is a void space for accommodating oil (i.e., refrigerant). As illustrated in FIGS. 1 to 3, 5, 6, the oil tank portion 20a includes multiple partition plates 20b for enhancing the cooling efficiency by an enlargement of a contact surface with the oil. The oil tank portion 20a is tightly sealed by a tank lid member 21 (see FIG. 4). The tank lid member 21 is fixedly attached to the knuckle 20 by means of a bolt 22. The knuckle 20 includes an outlet port 20c through which the oil within the oil tank portion 20a flows towards an inlet port 63a of the assembly of the housings 60 to 64 via the first pipe 23. The knuckle 20 also includes an inlet port 20d through which the oil sent from an outlet port 61a of the assembly of the housings 60 to 64 flows via the second pipe 24. The outlet port 20c and the inlet port 20d of the knuckle 20 are each formed by a flow passage connected to the oil tank portion 20a.

The first pipe 23 is provided to connect the outlet port 20c in the vicinity of the oil tank portion 20a of the knuckle 20 and the inlet port 63a of the assembly of the housings 60 to 64. The second pipe 24 is provided to connect the inlet port 20d in the vicinity of the oil tank portion 20a of the knuckle 20 and the outlet port 61a of the assembly of the housings 60 to 64. The first pipe 23 and the second pipe 24 may be each constituted by a flexible pipe, metal pipe, and the like.

The motor 30, which is an electrical motor serving as a power source, is incorporated within the assembly of the housings 60 to 64. The motor 30 includes a stator 31 fixedly attached to the housing 61, a coil 33 wound around each tooth of the stator 31, and a rotor 32 arranged at an inner peripheral side of the stator 31 by keeping a predetermined distance therebetween. The rotor 32 is fixedly attached to a rotor supporting member 34 at an inner peripheral side. The rotor supporting member 34 is fixedly attached to an output shaft 35 having a cylindrical shape at an inner peripheral side. The output shaft 35 is arranged at an outer peripheral side of the output shaft 45 so as to be relatively rotatable to the output shaft 45. The output shaft 35 is rotatably supported at the housing 60 via a bearing 37b. The output shaft 35 includes the passage 35a through which the oil sent from the passage 45a of the output shaft 45 is supplied to each component member of the motor 30. The output shaft 35 is rotatably supported at the housing 62 via a bearing 37c, a carrier 44 of the reduction gear 40, and a bearing 37d. The output shaft 35 includes a passage 35b (a second flow passage) through which the oil sent from a passage 45b of the output shaft 45 is supplied to each component member of the reduction gear 40. The output shaft 35 extends towards an inner periphery of a pinion gear 42 of the reduction gear 40. A substantially end portion of the output shaft 35 constitutes a sun gear 41 that engages with the pinion gear 42.

A bearing 37a supports the output shaft 45 to the housing 60 so that the output shaft 45 is rotatable to the housing 60. The bearing 37b supports the output shaft 35 to the housing 60 so that the output shaft 35 is rotatable to the housing 60. The bearing 37c is provided between the output shaft 35 and the carrier 44 to support the output shaft 35 and the carrier 44 to be relatively rotatable to each other. The bearing 37d supports the carrier 44 to the housing 62 so that the carrier 44 is rotatable to the housing 62. A bearing 37e supports the carrier 44 to the housing 63 so that the carrier 44 is rotatable to the housing 63. The reduction gear 40 is a mechanical apparatus for decreasing the rotational power of the output shaft 35 of the motor 30 and outputting the resulting rotational power through the output shaft 45. The reduction gear 40 is arranged between the motor 30 and the pump 50 and is incorporated within the assembly of the housings 60 to 64. In the reduction gear 40, the sun gear 41 rotates within a stable ring gear 43 to thereby rotate the pinion gear 42, which engages with the ring gear 43 and the sun gear 41, relative to the sun gear 41. Then, the carrier 44 rotatably supporting the pinion gear 42 rotates, which leads to the output of the rotational power from the output shaft 45 to integrally rotate with the carrier 44. The sun gear 41 is formed at the end portion of the output shaft 35 of the motor 30 at the vehicle body side shown by the arrow B in FIG. 2. The ring gear 43 is supported at the housing 62 so as not to be relatively rotatable to the housing 62. At a portion close to the tire (i.e., tire side shown by the arrow A in FIG. 2) relative to the pinion gear 42, the carrier 44 is rotatably supported at the housing 62 via the bearing 37d at an outer peripheral side and is supported at the output shaft 35 in a relatively rotatable manner via the bearing 37c at an inner peripheral side. In addition, at a portion close to the vehicle body (i.e., vehicle body side shown by the arrow B in FIG. 2) relative to the pinion gear 42, the carrier 44 is rotatably supported at the housing 63 via the bearing 37e at an outer peripheral side and is spline-connected to each of the output shaft 45 and a rotor 51 of the pump 50 so as not to be relatively rotatable thereto at an inner peripheral side. The output shaft 45 outputs the rotational power from the carrier 44. The output shaft 45 is rotatably supported at the housing 60 via the bearing 37a. The output shaft 45 is arranged at an inner peripheral side of the output shaft 35 of the motor 30 so as to be relatively rotatable thereto by keeping a predetermined distance with the output shaft 35. The output shaft 45, that extends to the outside of the assembly of the housings 60 to 64, is spline-connected to the hub 10 at an end portion so as not to be relatively rotatable to the hub 10. The output shaft 45 includes the passage 45c for introducing the oil (refrigerant), which is pumped from the rotor 51 of the pump 50, from the vehicle body side shown by the arrow B and the passage 45a through which the oil is supplied from the passage 45c to the passage 35a of the output shaft 35 of the motor 30. The output shaft 45 further includes the passage 45b for supplying the oil from the passage 45c to the passage 35b of the output shaft 35 of the motor 30.

The pump 50 is a turbo-type pump pumping the oil pumped from the oil tank portion 20a of the knuckle 20 to the inside of the assembly of the housings 60 to 64. The pump 50 includes the rotor 51 rotating within the housings 63 and 64. The rotor 51 is spline-connected to the carrier 44 of the reduction gear 40 at an inner periphery of a portion of the carrier 44 at the vehicle body side so as not to be relatively rotatable to the carrier 44. The rotor 51 rotates by means of the rotational power of the carrier 44. The rotation of the rotor 51 causes the oil sent from the inlet port 63a to an oil chamber surrounded by the housings 63 and 64 to be pumped towards the passage 45c of the output shaft 45.

Figure 3:
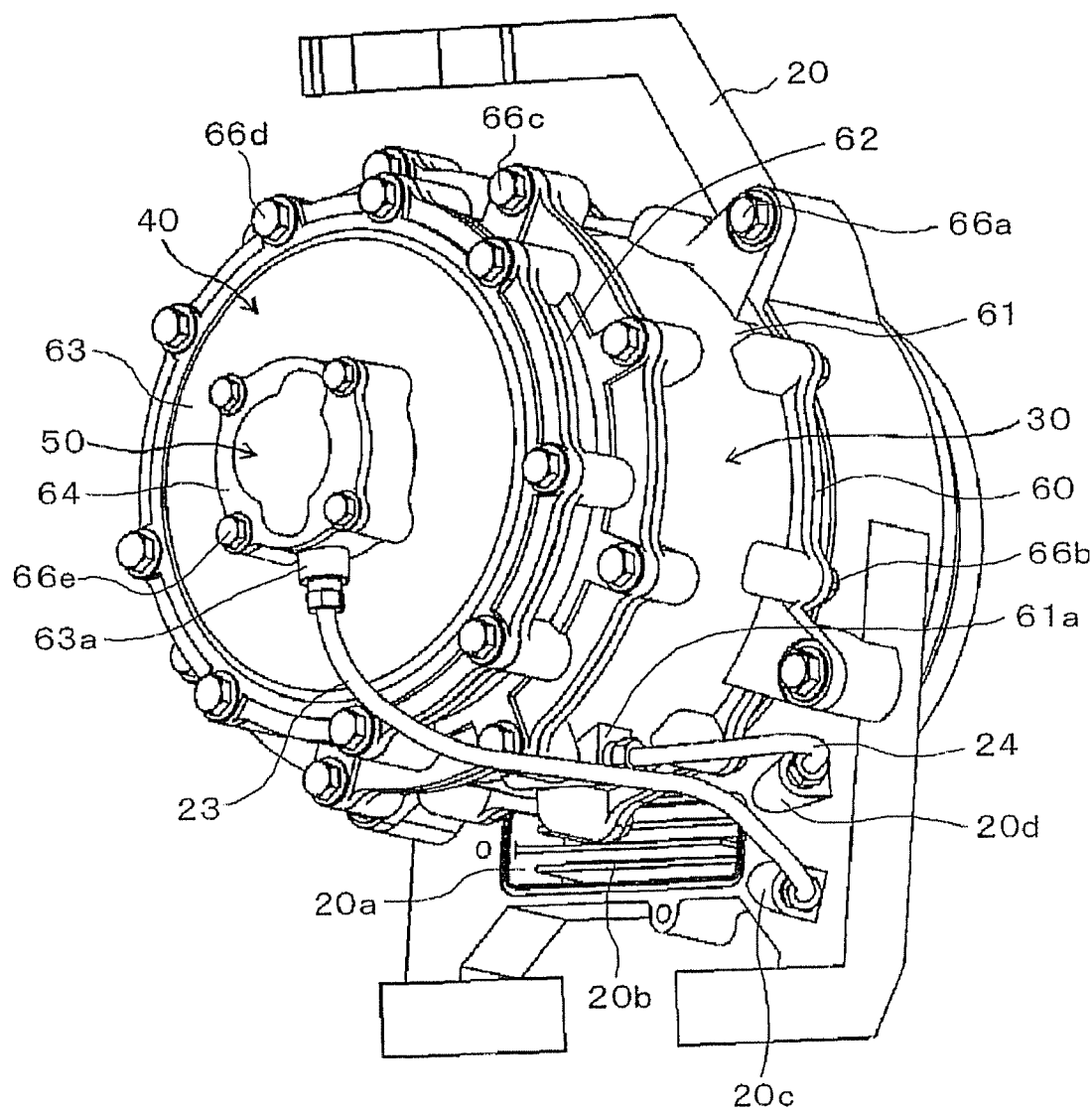
FIG. 3 is a perspective view illustrating a structure of the in-wheel motor system in which a tank lid member is omitted according to the embodiment of the present invention.
Figure 4:
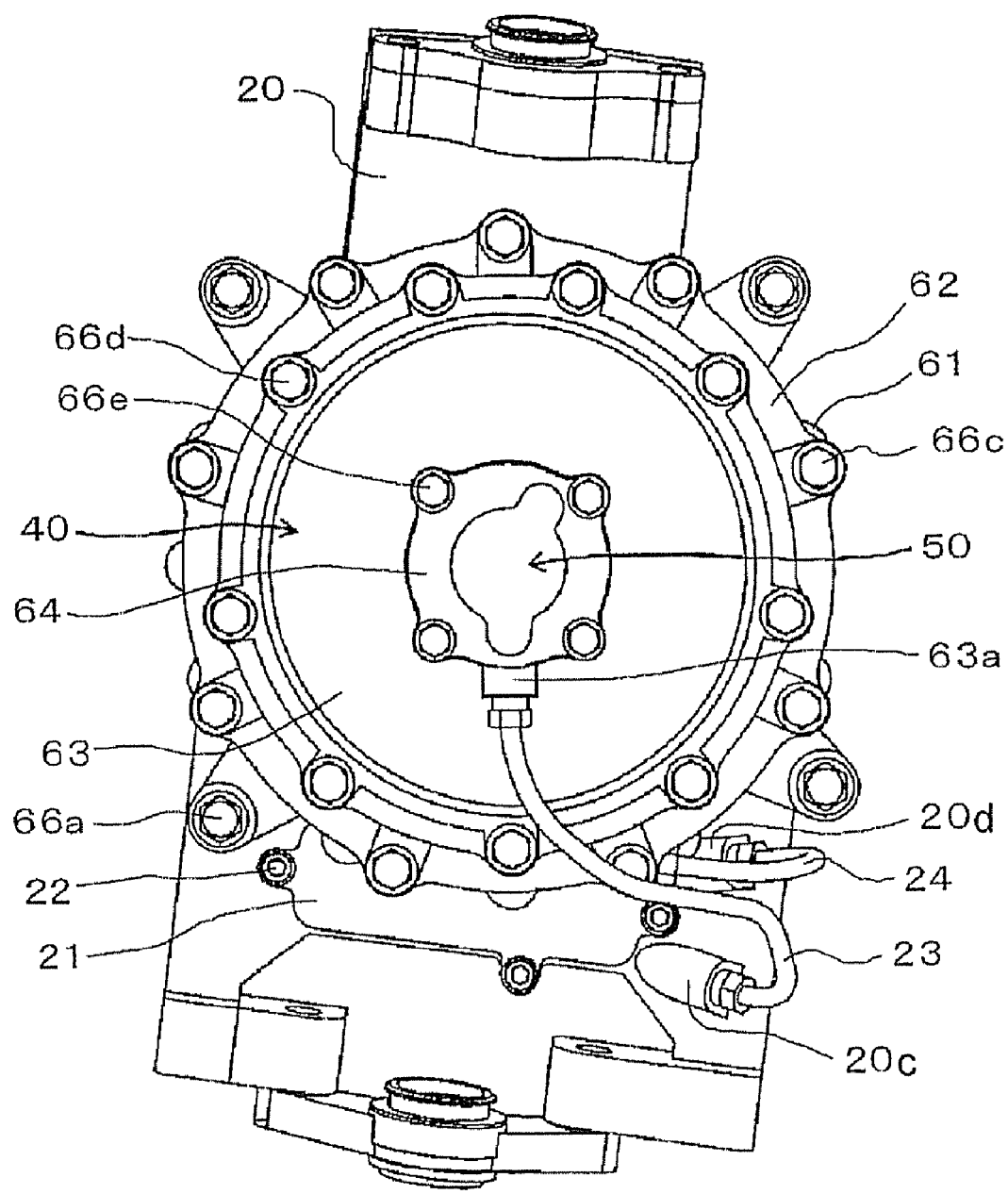
FIG. 4 is a front view illustrating a structure of the in-wheel motor system and viewed from a vehicle body side according to the embodiment of the present invention.
Figure 5:
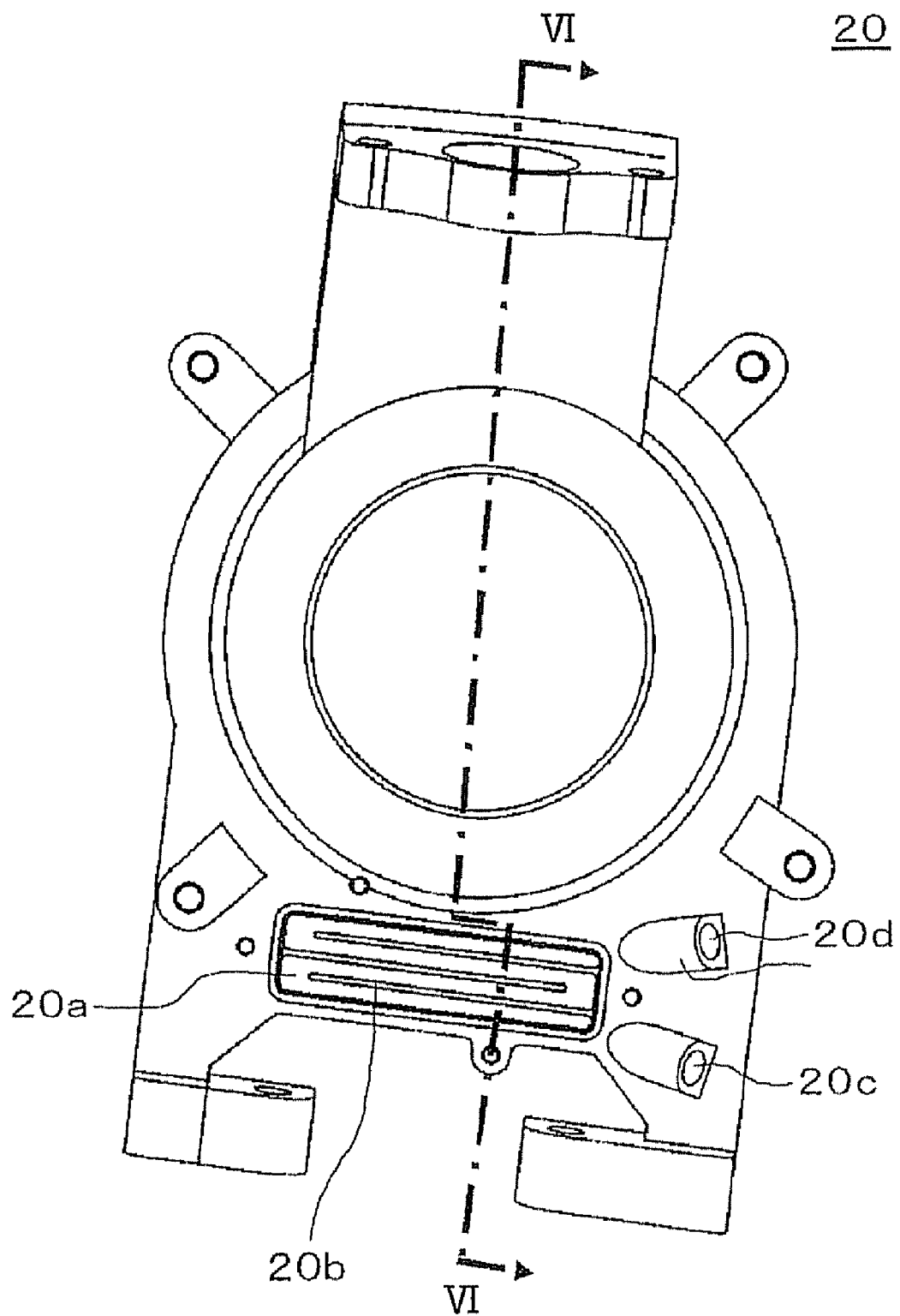
FIG. 5 is a front view illustrating a structure of a knuckle provided at the in-wheel motor system and viewed from the vehicle body side (tank lid member is omitted)
Figure 6:
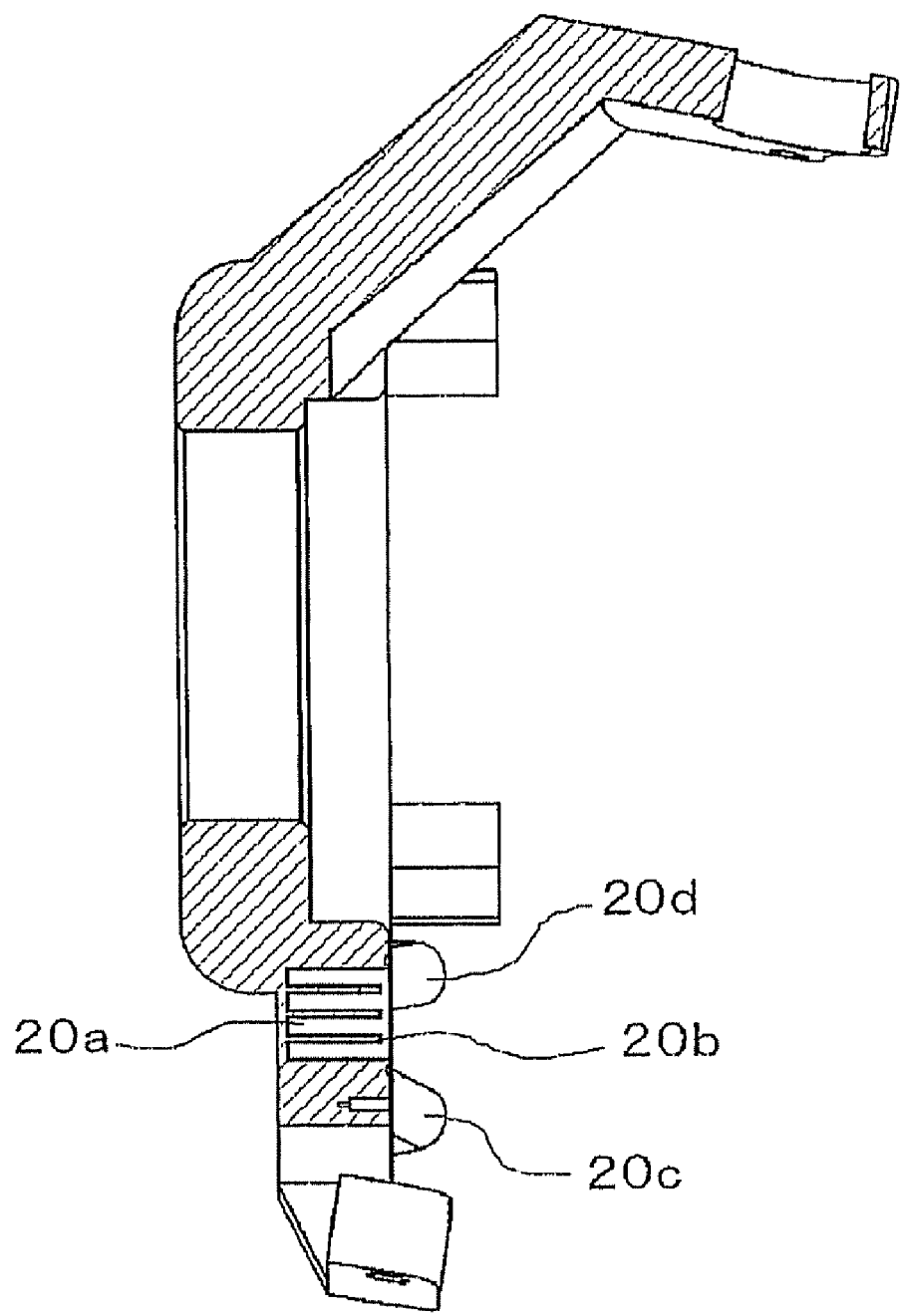
FIG. 6 is a cross-sectional view taken along the line VI-VI in FIG. 5 (in which the tank lid member is omitted) and illustrating a structure of the knuckle provided at the in-wheel motor system according to the embodiment of the present invention.

As illustrated in FIGS. 1 to 3, the housings 60 to 64 collectively serve as a case member incorporating therein the motor 30, the reduction gear 40, and the pump 50. The housings 60 to 64 are fixedly attached to a portion of the knuckle 20 at the vehicle body side. The housing 60 is a member for mainly covering a portion of the motor 30 at the tire side. The housing 60 is fixedly attached to the knuckle 20 via the bolt 66a (see FIGS. 3 and 4) and to the housing 61 via a bolt 66b. The housing 60 supports the output shaft 45 to be rotatable via the bearing 37a and supports the output shaft 35 to be rotatable via the bearing 37b. The housing 61 is a member for mainly covering the outer periphery of the motor 30. The housing 60 and the housing 62 are fixedly connected to the housing 61 via the bolt 66b and a bolt 66c, respectively. The housing 61 stabilizes the stator 31 of the motor 30 at an inner peripheral side. The housing 61 includes the outlet port 61a for flowing the oil within the assembly of the housings 60 to 64 towards the oil tank portion 20a via the second pipe 24. The housing 62 is a member for mainly covering the outer periphery of the reduction gear 40. The housing 62 is fixedly attached to the housing 61 via the bolt 66c and to the housing 63 via a bolt 66d. The housing 62 supports the carrier 44 to be rotatable via the bearing 37d. The housing 62 is spline-connected to the ring gear 43 at the inner peripheral side so as not to be relatively rotatable to the ring gear 43. The housing 63 is a member for mainly covering a portion of the reduction gear 40 at the vehicle body side. The housing 63 is fixedly attached to the housing 62 via the bolt 66d and to the housing 64 via a bolt 66e. The housing 63 supports the carrier 44 to be rotatable via the bearing 37e. The housing 63 includes the inlet port 63a for flowing the oil from the first pipe 23 to the inside of the assembly of the housings 60 to 64. The housing 64 is a member for mainly covering the pump 50 and is fixedly attached to the housing 63 via the bolt 66e.

Next, a flow of the oil in the in-wheel motor system according to the present embodiment will be explained below.

As illustrated in FIG. 2, the oil (refrigerant) within the oil tank portion 20a of the knuckle 20 is pumped by the pump 50 to the oil chamber surrounded by the housings 63 and 64 through the outlet port 20c of the knuckle 20, the first pipe 23, and the inlet port 63a of the housing 63. The pumped oil is sent to the passage 45c of the output shaft 45 by means of the rotation of the rotor 51 of the pump 50 and is supplied to the passages 45a and 45b.

The oil supplied to the passage 45a is sent to each component member of the motor 30 mainly via the passage 35a of the output shaft 35 of the motor 30 for cooling down each component member of the motor 30. In exchange for it, the temperature of the oil itself increases and thereafter the oil is accumulated at the bottom of the assembly of the housings 60 to 64 by means of gravity.

The oil supplied to the passage 45b is sent to each component member of the reduction gear 40 mainly via the passage 35b of the output shaft 35 of the motor 30 for cooling down each component member of the reduction gear 40. In exchange for it, the temperature of the oil itself increases and thereafter the oil is accumulated at the bottom of the assembly of the housings 60 to 64 by means of gravity.

The oil accumulated at the bottom of the assembly of the housings 60 to 64 is returned to the oil tank portion 20a of the knuckle 20 via the outlet port 61a, the second pipe 24, and the inlet port 20d. The oil returned to the oil tank portion 20a makes contact with a wall surface, the partition plates 20b, and the like of the oil tank portion 20a, thereby decreasing the temperature of the oil. The low-temperature oil is again pumped by the pump 50 to the oil chamber surrounded by the housings 63 and 64 via the outlet port 20c of the knuckle 20, the first pipe 23, and the inlet port 63a of the housing 63.

According to the aforementioned embodiment, the knuckle 20 and the assembly of the housings 60 to 64 accommodating therein the motor 30, the reduction gear 40, and the pump 50 are connected by means of the first pipe 23 and the second pipe 24. Then, the oil tank portion 20a is provided at the dead space of the knuckle 20 that affects the strength of the knuckle 20 to a lesser degree, thereby preventing a space for the oil tank to be provided separately at the vehicle body side. The oil for cooling the motor 30 is sufficiently accumulated or stored at the oil tank portion 20a. In addition, the heat capacity of the knuckle 20 itself and heat dissipation of the knuckle 20 while the vehicle is being driven increase the cooling efficiency. The partition plates 20b provided inside of the oil tank portion 20a causes the contact area between the oil and the knuckle 20 to increase. That is, the knuckle 20 itself functions as a radiator so that the oil cooling effect is expected and the cooling efficiency of the motor 30 is enhanced. Further, since the pump 50, the reduction gear 40, and the oil tank portion 20a are prevented from being arranged at the outer peripheral side of the motor 30, the outline of the motor 30 is enlarged, which leads to the motor with high output.

According to the aforementioned embodiment, the in-wheel motor system further includes the first pipe 23 sending the refrigerant within the oil tank portion 20a to the pump 50, the passages 45a, 45c, 35a sending the refrigerant pumped from the pump 50 to each component member of the motor 30, and the second pipe 24 sending the refrigerant within the housings 60 to 64 to the oil tank portion 20a.

In addition, the knuckle 20 includes partition plates 20b within the oil tank portion 20a.

Further, the in-wheel motor system includes the reduction gear 40 incorporated within the housings 60 to 64 and reducing the rotational power of the motor 30, the reduction gear 40 outputting the reduced rotational power to the hub 10 and the pump 50.

Furthermore, the in-wheel motor system includes the passage 35b sending the refrigerant pumped from the pump 50 to each component member of the reduction gear 40 provided within the housings 60 to 64.

Furthermore, the reduction gear 40 is arranged at an opposite side of the motor 30 from the wheel side and the pump 50 is arranged at an opposite side of the reduction gear 40 from the wheel side.

Furthermore, the oil tank portion 20a is arranged at a lower position than a position where the housings 60 to 64 are provided.

Furthermore, the multiple partition plates 20b are provided within the oil tank portion 20b.

Furthermore, the first pipe 23 is connected to the outlet port 20c provided at the knuckle 20 and the inlet port 63a provided at the housings 60 to 64 while the second pipe 24 is connected to the outlet port 61a provided at the housings 60 to 64 and the inlet port 20d provided at the knuckle 20.

Furthermore, the outlet port 20c provided at the knuckle 20 is positioned at a lower side of the oil tank portion 20a while the inlet port 20d provided at the knuckle 20 is positioned at an upper side of the oil tank portion 20a.

Furthermore, the upper end portion of the knuckle 20 is connected to the upper arm 72 of the suspension apparatus 70 while the lower end portion of the knuckle 20 is connected to the lower arm 73 of the suspension apparatus 70, and the knuckle 20 is biased towards a road surface side by the shock absorber 71 via the lower arm 73.

Furthermore, the hub 10 includes the flange portion 10a at the wheel side and the cylindrical portion 10b extending to the vehicle body side from a center of the flange portion 10a, and the hub 10 is rotatably supported at the knuckle 20 via the bearing 11 at the outer periphery of the cylindrical portion 10b and is spline-connected to the output shaft 45 for outputting the rotational power of the motor 30 at the inner periphery of the cylindrical portion 10b, the hub 10 being prevented from being relatively rotatable to the output shaft 45.

Furthermore, the oil tank portion 20a is arranged at the road surface side relative to the cylindrical portion 10b of the hub 10.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An in-wheel motor system, comprising:
a knuckle supporting a hub to be rotatable and including a tank portion in which a refrigerant is accumulated;
a housing formed as a component different from the knuckle and fixedly attached to the knuckle;
a motor incorporated within the housing and driving the hub to rotate;
a pump incorporated within the housing and pumping the refrigerant accumulated within the tank portion to the motor by means of a rotational power of the motor to refrigerate the motor;
a first pipe connecting the pump and the tank portion without passing through the knuckle and sending the refrigerant within the tank portion to the pump;
a first flow passage sending the refrigerant pumped from the pump to each component member of the motor; and
a second pipe connecting the housing and the tank portion without passing through the knuckle and sending the refrigerant within the housing to the tank portion.

2. The in-wheel motor system according to claim 1, wherein the knuckle includes a partition plate within the tank portion.

3. The in-wheel motor system according to claim 1, further comprising a reduction gear incorporated within the housing and reducing the rotational power of the motor, the reduction gear outputting the reduced rotational power to the hub and the pump.

4. The in-wheel motor system according to claim 3, further comprising a second flow passage sending the refrigerant pumped from the pump to each component member of the reduction gear provided within the housing.

5. The in-wheel motor system according to claim 3, wherein the reduction gear is arranged at an opposite side of the motor from a wheel side and the pump is arranged at an opposite side of the reduction gear from the wheel side.

6. The in-wheel motor system according to claim 1, wherein the tank portion is arranged at a lower position than a position where the housing is provided.

7. The in-wheel motor system according to claim 6, wherein a plurality of the partition plates is provided within the tank portion.

8. The in-wheel motor system according to claim 1, wherein the first pipe is connected to an outlet port provided at the knuckle and an inlet port provided at the housing while the second pipe is connected to an outlet port provided at the housing and an inlet port provided at the knuckle.

9. The in-wheel motor system according to claim 8, wherein the outlet port provided at the knuckle is positioned at a lower side of the tank portion while the inlet port provided at the knuckle is positioned at an upper side of the tank portion.

10. The in-wheel motor system according to claim 1, wherein an upper end portion of the knuckle is connected to an upper arm of a suspension apparatus while a lower end portion of the knuckle is connected to a lower arm of the suspension apparatus, and the knuckle is biased towards a road surface side by a shock absorber via the lower arm.

11. The in-wheel motor system according to claim 1, wherein the hub includes a flange portion at the wheel side and a cylindrical portion extending to a vehicle body side from a center of the flange portion, and the hub is rotatably supported at the knuckle via a bearing at an outer periphery of the cylindrical portion and is spline-connected to an output shaft for outputting a rotational power of the motor at an inner periphery of the cylindrical portion, the hub being prevented from being relatively rotatable to the output shaft.

12. The in-wheel motor system according to claim 11, wherein the tank portion is arranged at the road surface side relative to the cylindrical portion of the hub.

13. The in-wheel motor system according to claim 1, wherein the housing covers an outermost circumferential periphery of the motor.

14. The in-wheel motor system according to claim 1, wherein the motor is disposed between the tank portion and the pump with respect to a direction corresponding to a rotational axis of the motor.

15. The in-wheel motor system according to claim 3, wherein an output shaft of the motor, an output shaft of the reduction gear and the hub are coaxial.

16. The in-wheel motor system according to claim 5, wherein the housing covers an outermost circumferential periphery of the reduction gear.

* * * * *